United States Patent Office 3,330,852
Patented July 11, 1967

3,330,852
PREPARATION OF UREA AND
CYANOALKYLTHIOETHERS
Edward A. Swakon, Hammond, Ind., assignor to Standard Oil Company, Chicago, Ill., a corporation of Indiana
No Drawing. Filed Mar. 27, 1964, Ser. No. 355,496
6 Claims. (Cl. 260—465.8)

This invention relates to urea and bis(cyanoalky-sulfides and more particularly pertains to a method of preparing symmetrical ureas and bis(cyanoalkyl)sulfides.

The reaction between N,N-disubstituted monothiolcarbamic acid amine salts and acrylonitrile and its homologs has been found to produce 2-cyanoethyl N,N-disubstituted monothiolcarbamates as follows:

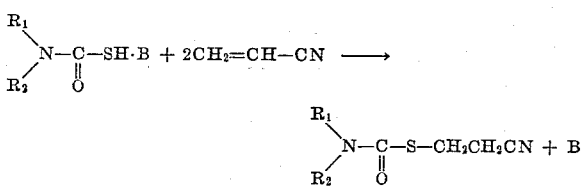

wherein $R_1$ and $R_2$ are alkyl, aryl, heterocyclic and joined are nitrogen-containing heterocyclic and B is a secondary or tertiary amine. The N,N-disubstituted monothiolcarbamic acid amine salt is obtained by reaction of carbonyl sulfide with two moles of a secondary amine or one mole each of a secondary amine and a tertiary amine.

The reaction betwen monothiolcarbamic acid ammonia salt and mono N-substituted monothiolcarbamic acid amine salt and acrylonitrile and its homologs do not, I have discovered, proceed in the above manner. Rather two products are formed. One product is urea or sym. N,N-disubstituted urea and the other is a bis-(cyanoalkyl)sulfide. Because of the presence of the two cyano groups in the thioether product these products can be used as intermediates to prepare other organic compounds through the known reactivity of the cyano groups. For example, reduction of the bis(cyanoalkyl) sulfides with hydrogen provides a convenient route to valuable diamino thiothers, bis(aminoalkyl)sulfides. By controlled hydrolysis the bis(cyanoalkyl)sulfides can be converted to bis(carboxyamidoalkyl)sulfide as for example through alkaline hydrogen peroxide hydrolysis or hydrolyzed all the way in the presence of acid or base to bis-(carboxyalkyl)sulfides. By reaction with an alcohol the bis(cyanoalkyl)sulfides can be converted to bis(imido ester)sulfides. For example, bis(cyanoethyl)sulfide when reacted with ethyl alcohol can result in bis(ethoxycarbimidoethyl)sulfide according to the following:

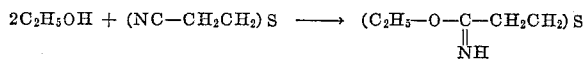

These few reactions will suggest to those skilled in the art many others including further reactions of the derivatives of bis(cyanoalkyl)sulfides hereinbefore given.

The method of this invention comprises, then, the reaction of acrylonitrile or a homolog thereof with ammonium monothiolcarbamate or mono-N-substituted monothiolcarbamate amine (primary or tertiary amine) salt. The reaction involved can be expressed:

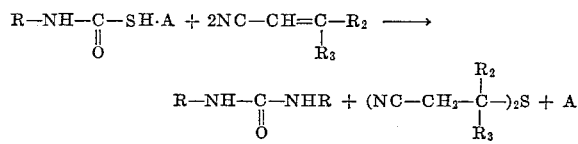

wherein R is hydrogen, an alkyl hydrocarbon group, an alkoxyalkyl group, a hydroxyalkyl group, a cycloalkyl hydrocarbon group, an alkoxycycloalkyl hydrocarbon group, an aryl hydrocarbon group, A is a primary amine whose one N-substituent corresponds to R or is any tertiary amine, $R_2$ and $R_3$ are hydrogen, alkyl hydrocarbon, cycloalkyl hydrocarbon, and aryl hydrocarbon.

The reaction betwen the acrylonitrile and ammonium monothiolcarbamate or N-substituted monothiolcarbamate amine salt is slightly exothermic. In general, then, the method of this invention can be carried out at ambient temperatures. Addition of external heat say by heating to 40–80° C. will expedite the reaction if rapid reaction is desired. Even when one starts with gaseous COS and $NH_3$ to produce ammonium monothiolcarbamate and then reacts the acrylonitrile, ambient temperatures and pressures can be used.

Ammonium monothiolcarbamate is derived from ammonia and COS. The mono-N-substituted monothiolcarbamates are derived from such primary amines as methyl amine, ethyl amine, n-propylamine, isopropyl-amine, n-butylamine, isobutylamine, sec.-butylamine, t-butylamine, amylamine, isoamylamine, sec.-amylamine, t-amylamine, hexylamine, heptylamine, octylamine, decylamine, dodecylamine, hendecylamine, cyclopentylamine, cyclohexylamine, aniline, toluidines, xylidines, mesidine, 1-naphthylamine, 2-furanamine, 2-p-dioxanamine, 3-gamma-pyranylamine, xenylamine, benzylamine, phenethylamine, furfurylamine, 1-indanethylamine, hydroxyethylamine, 2-amino-1,3,5-thiadiazole, methyl p-aminobenzoate, and the like. It is appreciated that the N-substituent of the foregoing primary amines appears as the N and N' substituents of the symmetrical disubstituted urea products. To form the sym. N,N'-disubstituted urea, amine[(A)] salts of the mono-N-substituted monothiolcarbamic acids should be the same, i.e. have the same N-substituent as the amine moiety of the monothiolcarbamic acid.

Suitable reactant acryconitriles include acrylonitrile and higher homologs thereof (vinyl nitriles) of which crotononitrile, 3-cyclohexylacrylonitrile, 2,3-(di-1-naphthyl)-acrylonitrile, 2,3-di-phenylacrylonitrile, 3,3-diphenyl-2-m-(tolyl)acrylonitrile, 3,3 - diphenyl - 2 - (p-tolyl)-acrylonitrile, 2-methyl-3-phenylacrylonitrile, 2-mesityl-3-phenylacrylonitrile, triphenylacrylonitrile, 2-benzylacrylonitrile, atroponitrile, cinnamonitrile, caprinitrile and alphamethylcaprinitrile, among others are illustrative.

The following illustrative examples are given for a more complete understanding and to suggest the preparation of additional ureas and bis(cyanoalkyl)sulfides according to this invention.

Example 1

To an open flask containing 8:5 grams of ammonia dissolved in 125 grams of methanol there is added carbonyl sulfide gas until 15 grams are taken up. The resulting solution is clear. To the clear solution at about 25° C., acrylonitrile, 13.5 grams, is added slowly. Reaction takes place immediately and the final temperature after addition of all acrylonitrile is 42° C. Methanol is removed by distillation leaving 28 grams of residue. Tetrahydrofuran is added to the residue with stirring and a white solid forms. The white solid, 10 grams, is recovered by filtration. The white solid is identified as urea. The filtrate (tetrahydrofuran solution) is distilled to first remove the solvent and then recover dissolved product. There is recovered 11.8 grams of product at 150° C. and 0.6 mm. Hg. This product is found by infra-red analysis to have a weak band at 2.75 m$\mu$, a fairly strong band at 4.5 m$\mu$ (—CN group) and a strong band at 7.1 m$\mu$. This product is bis(beta-cyanoethyl)sulfide:

Example 2

Sym. N,N'-di-n-butylurea and bis(beta-cyanoethyl)sulfide are prepared by reacting one mole of n-butylamine salt of N-n-butylmonothiolcarbamic acid and two moles of acrylonitrile in the presence of methanol. After removal of methanol by distillation, the residue is contacted with tetrahydrofuran to dissolve bis(beta-cyanoethyl)sulfide and leave sym. N,N'-di-n-butyl urea as a residue which is then recovered by filtration. The bis(beta-cyanoethyl)sulfide is recovered by distillation as described in Example 1.

Example 3

To a solution of one mole of ammonium monothiolcarbamate in methanol there is added two moles of crotononitrile. Methanol is then removed by distillation leaving a residue. The residue is treated with tetrahydrofuran leaving a white residue (urea). Urea is recovered by filtration. The filtrate is distilled to remove the solvent and to recover bis(cyanopropyl)sulfide.

Example 4

To a solution of one mole of cyclohexylamine salt of N-cyclohexyl monothiolcarbamic acid in ethanol there is added two moles of alpha methyl acrylonitrile. The ethanol is removed by distillation leaving a residue. The residue is contacted with tetrahydrofuran leaving a solid (sym. N,N'-dicyclohexyl urea). Sym. N,N'-dicyclohexyl urea is recovered by filtration and the filtrate is distilled to remove the solvent and recover bis(cyanoisopropyl)sulfide.

Example 5

Two moles of benzylacrylonitrile are reacted with one mole ammonium monothiolcarbamate dissolved in methanol. Methanol is removed by distillation and the residue is treated with tetrahydrofuran to leave urea undissolved. Urea is recovered by filtration and the filtrate is distilled to remove solvent and recover bis(cyanomethylphenyl)sulfide.

It would appear from our previous work with N,N-disubstituted monothiolcarbamates, that vinyl ketones and acrylic acid esters can also be reacted with ammonium monothiolcarbamate or primary amine salts of mono-N'-substituted monothiolcarbamic acids to produce urea or sym. N,N'-disubstituted ureas with the corresponding thioether products. For example, by reacting one mole of ammonium monothiolcarbamate with two moles of ethyl acrylate or two moles of acrylophenone there may be obtained urea together with bis(ethylcarboxyethyl)sulfide or bis(beta-benzoylethyl)sulfide, respectively, as coproducts.

Thus, this invention broadly comprises reacting a vinylnitrile or a vinyl ketone or an ester of a vinyl acid with ammonium monothiolcarbamate or a monothiolcarbamate derived from a primary amine in the ratio of two moles of said vinyl reactant per mole of monothiolcarbamate to produce simultaneously a urea such as urea or sym. N,N'-disubstituted urea and a thioether to whose sulfur atom are attached alkyl groups substituted with either a cyano group, or an acyl group (that is, the acrylating portion of an acid anhydride or halide) or an alkoxycarboxy group.

What is claimed is:

1. A method of preparing a bis(cyanoalkyl)sulfide which comprises reacting the mole ratio of 2 moles of (A) a vinyl nitrile with one mole (B) ammonium monothiolcarbamate or the monothiolcarbamate derived from the reaction of one mole carbonyl sulfide with 2 moles primary amine and at the same time preparing urea when reactant (B) is ammonium monothiolcarbamate or a symmetrical N,N'-disubstituted urea when reactant (B) is said monothiolcarbamate from said reaction of carbonyl sulfide and primary amine, wherein said N,N'-substituents are identical to the substituent on the nitrogen of the primary amine.

2. A method of preparing a bis(cyanoalkyl)sulfide and urea or symmetrical N,N'-disubstituted urea, which method comprises reacting a vinyl nitrile with ammonium monothiolcarbamate or a monothiolcarbamate derived by the reaction of one mole of carbonyl sulfide with two moles of a primary amine, in the proportions of two moles of said vinyl nitrile for each mole of said monothiolcarbamate.

3. A method of preparing a bis(cyanoalkyl)sulfide and urea which comprises reacting for each mole of ammonium monothiolcarbamate two moles of a vinyl nitrile.

4. A method of preparing bis(cyanoethyl)sulfide and urea which comprises reacting with each mole of ammonium monothiolcarbamate two moles of acrylonitrile.

5. A method of preparing sym. N,N'-di-n-butylurea and bis(beta-cyanoethyl)sulfide which comprises reacting n-butylamine salt of N(n-butyl) monothiolcarbamic acid with acrylonitrile in the ratio of two moles of acrylonitrile for each mole of said amine salt.

6. A method of preparing sym. N,N'-dicyclohexylurea and bis(cyanoisopropyl)sulfide which comprises reacting cyclohexylamine salt of N-cyclohexyl monothiolcarbamic acid with alpha-methyl acrylonitrile in the ratio of two moles of alpha-methyl acrylonitrile for each mole of said amine salt.

No references cited.

CHARLES B. PARKER, *Primary Examiner.*

JOSEPH P. BRUST, *Examiner.*